April 21, 1925.

J. M. FRASER

PRESSER BOARD

Filed June 18, 1924

1,534,510

INVENTOR.
James M. Fraser.
BY Harry W. Bown.
ATTORNEY.

Patented Apr. 21, 1925.

1,534,510

UNITED STATES PATENT OFFICE.

JAMES M. FRASER, OF STAFFORD SPRINGS, CONNECTICUT.

PRESSER BOARD.

Application filed June 18, 1924. Serial No. 720,868.

*To all whom it may concern:*

Be it known that I, JAMES M. FRASER, a citizen of the United States, residing at Stafford Springs, in the county of Tolland and State of Connecticut, have invented new and useful Improvements in Presser Boards, of which the following is a specification.

This invention relates to improvements in presser boards which are used in card feeding machines of the Bramwell type for the purpose of subjecting the wool in the hopper of the machine to a uniform pressure so that the wool may be caught and taken up by the usual spike apron or conveyor in equal quantities and free from bunches when it is delivered to the usual weighing pan.

Heretofore, it has been an objection to this class of machines that the wool is not delivered to the weighing pans in uniform quantities resulting in waste of material as well as in the production of goods that do not fully comply with the weight which is desired. The principal objection occurs when the spike apron carries up and delivers the wool in bunches instead of a uniform and even delivery to the weighing pan.

An object, therefore, of my invention is to provide a device which will automatically exert a uniform pressure on the supply of wool in the hopper and whether or not the machine is full or nearly empty.

Broadly stated, my improvement comprises a freely depending or suspended member, which is supported on an inclined guide, or bracket member, whereby it may readily and automatically assume different vertical positions due to the action of gravity and relative to the quantity of wool in the machine. The improvement is so constructed and arranged that the pressure may be varied by simply changing the angle of inclination of the supporting guide or bracket member, whereby the weight of the pressure board will subject the wool to a greater or lesser lateral pressure, depending upon the angle of inclination of the guide, as will be described.

Referring to the drawings.

Figure 1:
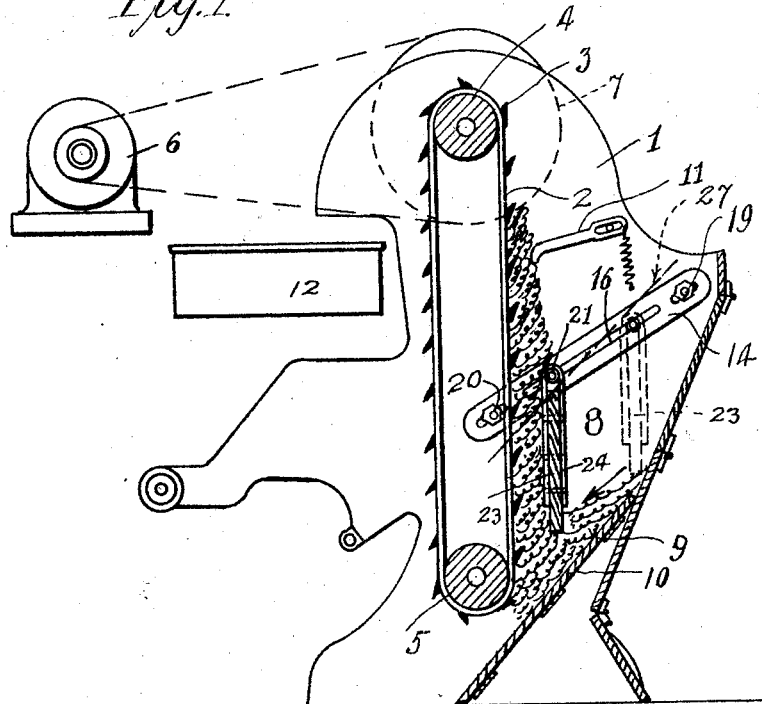
Fig. 1 is a side elevational view partly in section, showing the presser board attached to the card feeding machine.
Figure 2:
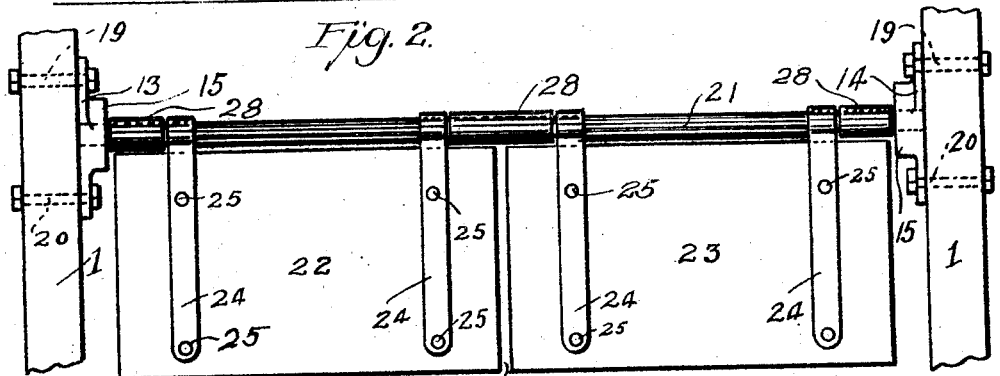
Fig. 2 is an elevational view of the board removed from the machine, and illustrating the two freely suspended parts of the board.
Figures 3, 4:
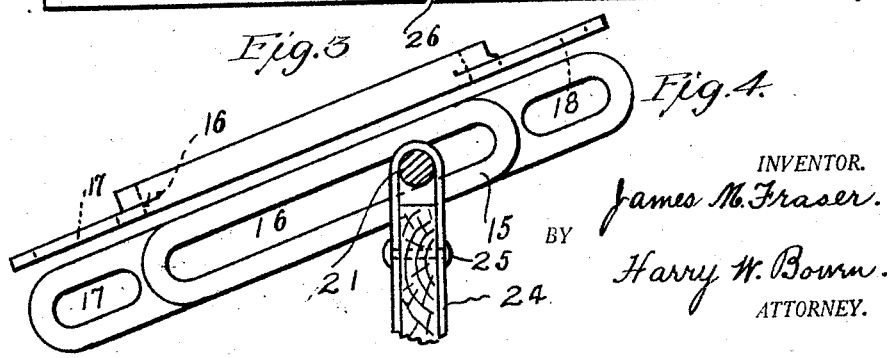
Fig. 3 is an enlarged detail edge view of the supporting bracket or guide member for the presser board and Fig. 4 is a side elevational view of the bracket.

Referring to the drawings in detail:

1 designates the end walls of the main frame work having the usual spike or elevating apron 2 located therein which is provided with the sharp pins or wool catching pins 3. This apron or endless carrier is supported on and driven by the shaft 4 and passes around the freely rotatable shaft 5 in the usual manner. A driving motor, or any suitable motive power, is conventionally indicated at 6 that is belted to a pulley 7. 8 designates the hopper or space in which the wool 9 is placed and automatically slides downward on the inclined bottom board 10. 11 is the usual comb device, and 12 the weighing pan into which the wool from the apron 2 is delivered. Referring now to my improvement, 13 and 14 are a pair of brackets or guide blocks, which are secured to the inner surfaces of the end plates 1 of the main frame. These brackets are each formed with a hub or boss portion 15 in which is formed the longitudinal groove or guide way 16, and the longitudinal openings 17 and 18 at each end. These openings are for the purpose of receiving the securing bolts 19 and 20 which permits the brackets as a whole to be adjusted longitudinally. Slidably located in the longitudinal openings 16 is the rod 21. On this rod are freely suspended the two sections 22 and 23 of the presser board, by means of the straps 24 which pass around the rod 21 and along the opposite sides of the sections 22 and 23 to which they are secured by means of the rivets 25. The sections are separated a short distance from each other at their inner edges as indicated at 26 whereby each section is permitted to freely move independent of each other. Fig. 1 shows the parts assembled and in operation, which is as follows. Assuming that the wool 9 is to be separated and delivered to the weighing pan 12 when the machine is operated. The presser board sections are in the position shown, which is substantially a vertical plane. As the wool is taken up by the apron the sections of the board will automatically assume the different vertical positions, and, at the same time automatically subject the wool 9 to a uniform and constant lateral pressure, due to the force of gravity causing the rod 21 and the sections of the board slide down the groove 16 which is arranged in an inclined position. The weight of the sections of the presser board causes the sections to produce a uniform and horizontal pressure on the supply of wool with the resulting effect that the wool is taken up by the apron in a uniform quantity and delivered to the weighing pan 12, thus effectually preventing any bunching of the wool as it is delivered. When the wool is delivered in bunches due to an improper feeding of the apron the scales are usually tipped with too much therein, thus causing a wrong weight.

The degree of lateral pressure exerted by the presser board may be varied by changing the angle of inclination of the brackets as indicated by the dotted line 27, shown in Fig. 1. Spacing tubes 28 are placed on the rod 21 for maintaining the presser board sections 22 and 23 in place.

From this description it will be seen that I have provided a very efficient and inexpensive device for automatically maintaining a lateral pressure on the wool and against the apron, and particularly one which will cause substantially all of the wool in the hopper to be carried away by the apron without loss or inconvenience. This is a very important feature of my improvement as often only a small quantity of wool of a certain color or grade is to be weighed and it is very necessary that the machine should successfully operate to carry away all of the wool in the hopper without loss or waste. It is apparent that the sections 22 and 23 of the presser board can rotate or turn freely on the rod 21 by reason of the strap hinges 24. The opening 18 permits the brackets to be adjustably secured to the end pieces 1 for the purpose of varying the position of the presser board with reference to the apron so that all of the wool may be carried out of the hopper.

It will also be seen that the presser board will follow up the wool in the hopper and exert a constant lateral or uniform pressure thereon due to the force of gravity which causes the rod 21 and the presser board attached thereto to slide down the inclined grooves 16 of the brackets. By adjusting the brackets the pressure may be readily changed and the rate of removal of the wool also changed as readily understood.

What I claim is:

1. In a machine of the kind described, the combination with an elevating spike apron, a presser board, means for supporting the same for producing a uniform lateral pressure in a direction towards the apron, said means comprising a pair of supporting brackets each formed with a groove, a rod in the groove, and said boards being pivotally connected to the rod, and the brackets being arranged in an inclined position, and means for securing the brackets to the machine.

2. A presser board construction for the purpose described, a movable elevating apron provided with spikes, a pair of supporting brackets, means for adjustably securing the same to the frame of the machine in an inclined position, the brackets each having a groove therein, a slidable rod in the groove, a board loosely mounted for swinging movements on the rod so as to normally assume a vertical position relative to the apron for subjecting the material between the board and apron to a uniform lateral pressure, as described.

3. In combination, a presser board for the purpose described, an elevating apron provided with spikes, means for operating the elevating apron, grooved brackets secured to the frame of the machine in inclined positions, a rod mounted slidably in the grooves of the brackets, a sectional presser board loosely mounted at its upper edge on the rod for permitting it to swing freely on the rod for following up the material for forcing it against the said apron with a constant pressure due to the effect of gravity which causes the rod to slide down the inclined arranged grooves.

4. In combination, a movable elevating apron, lifting prongs thereon, a presser board, means for supporting the presser board, said means comprising a pair of grooved brackets which are arranged in an inclined position, a rod slidable in the grooves, the board being pivotally suspended on the rod for free swinging movements, said board being so constructed and arranged as to normally assume different vertical positions.

5. In combination, a presser board, for the purpose described, an elevating apron, means for permitting the board to automatically assume different vertical positions due to the force of gravity, said means comprising a pair of inclined supports secured to the main frame having a groove therein, a member in the groove, the presser board freely suspended on the member.

JAMES M. FRASER.